Aug. 14, 1956　　　　J. FRYE　　　　2,759,090
HEAT SEALING AND CUTTING DEVICE
Filed Oct. 20, 1952　　　　　　　　6 Sheets-Sheet 1
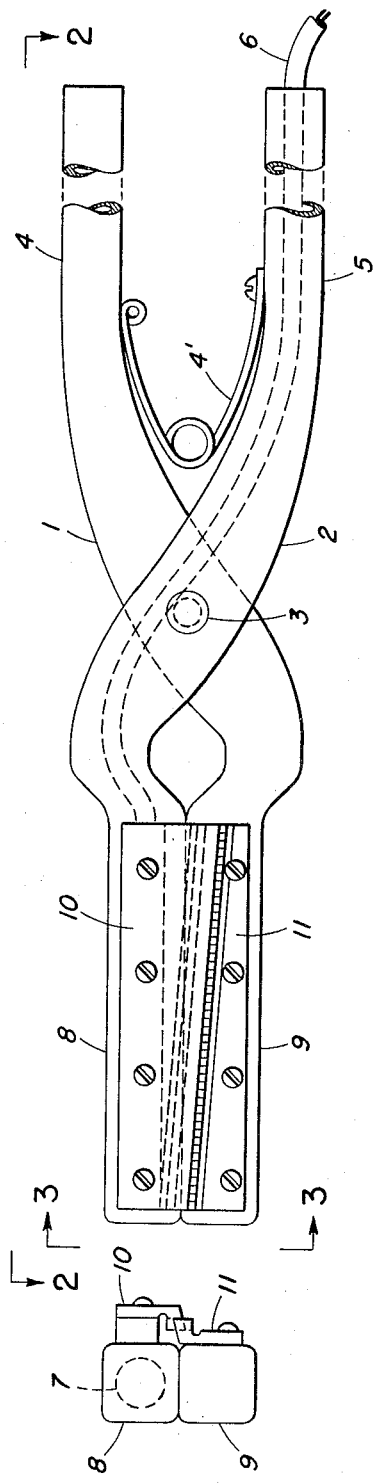
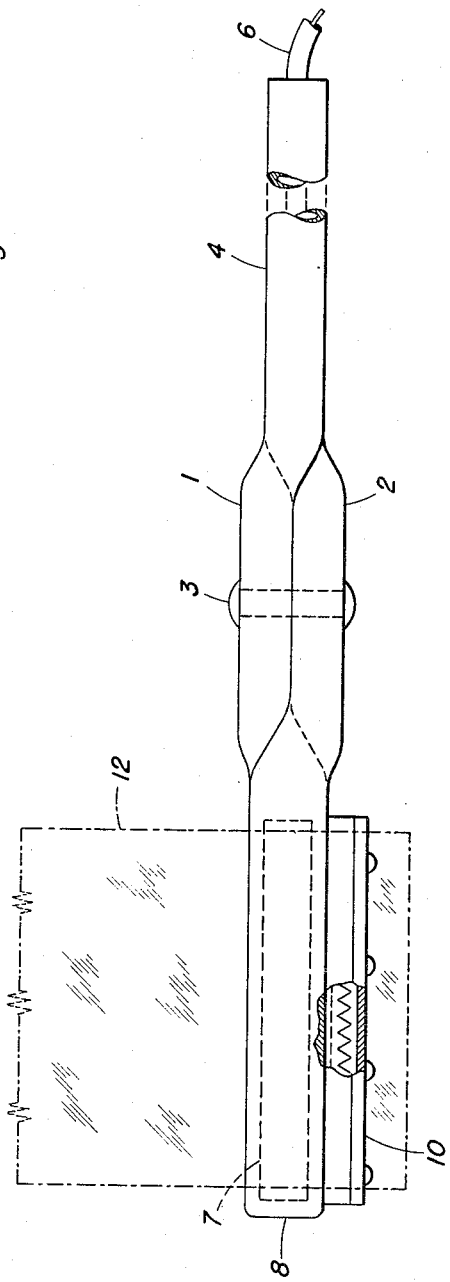
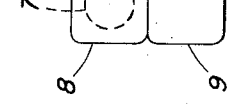
Jack Frye
INVENTOR
BY
ATTORNEY

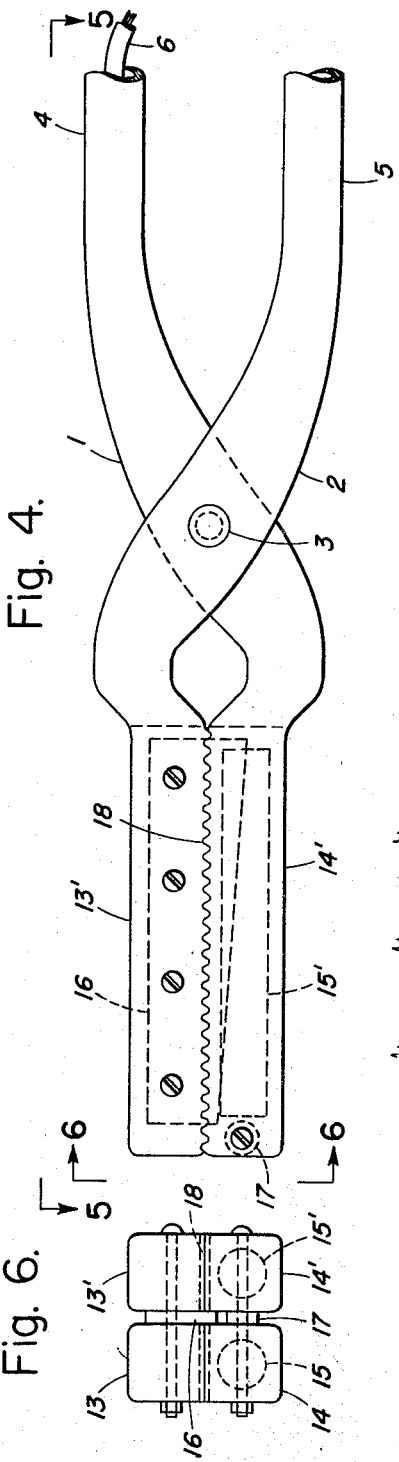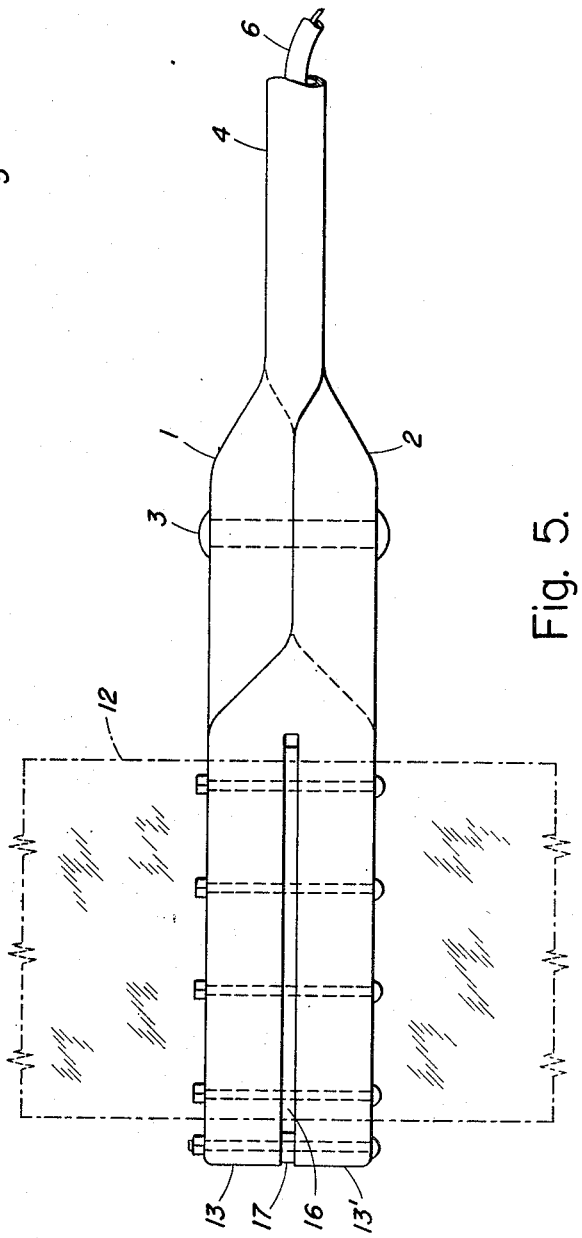
Jack Frye
INVENTOR

Aug. 14, 1956  J. FRYE  2,759,090
HEAT SEALING AND CUTTING DEVICE
Filed Oct. 20, 1952  6 Sheets-Sheet 3
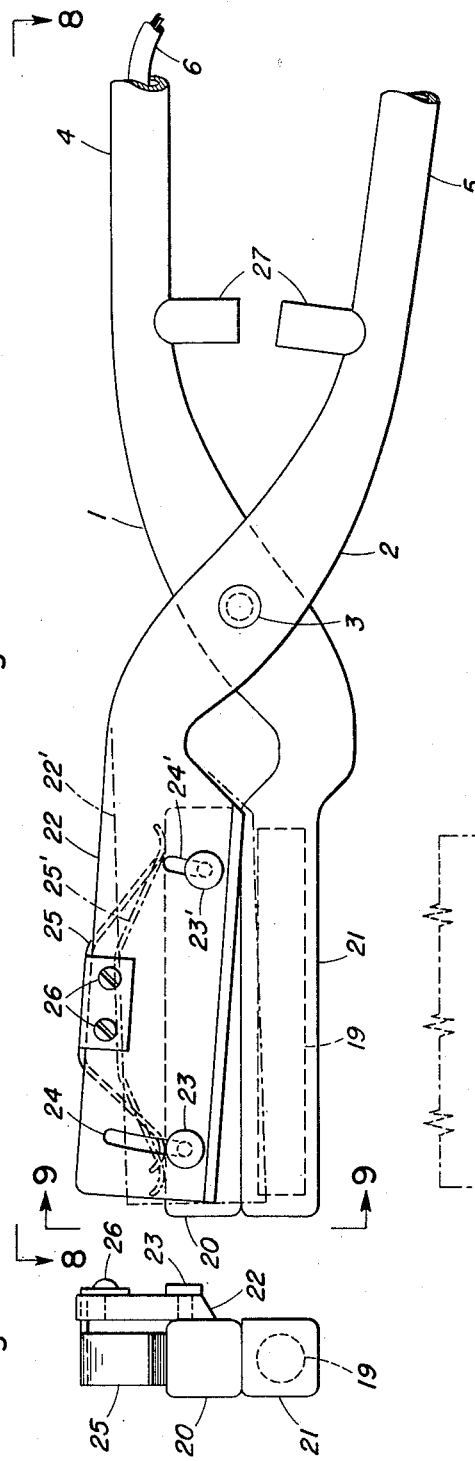
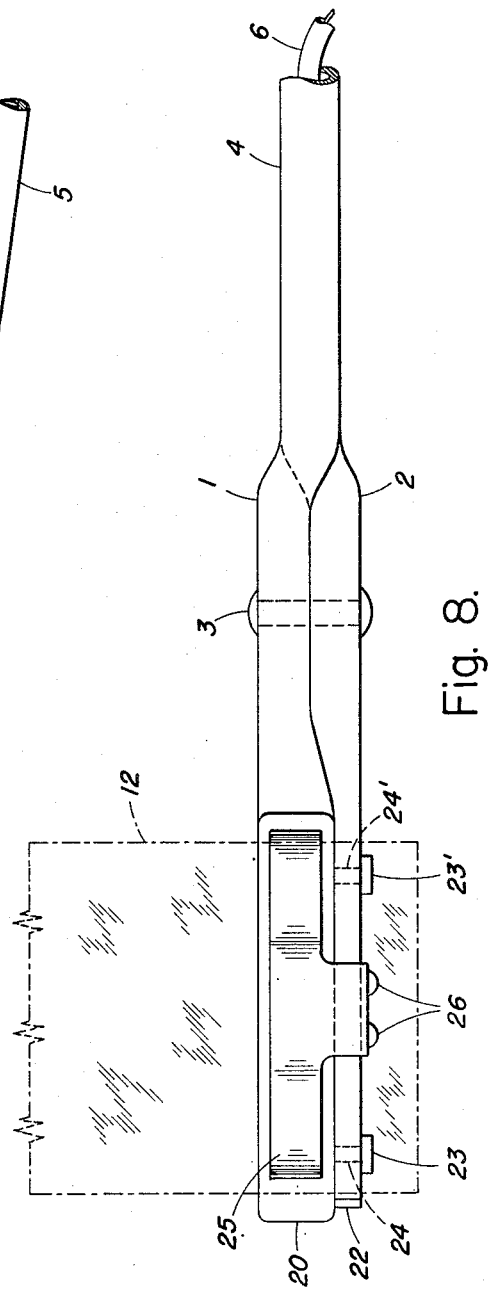
Jack Frye
INVENTOR
BY Donald F. McCarthy
ATTORNEY

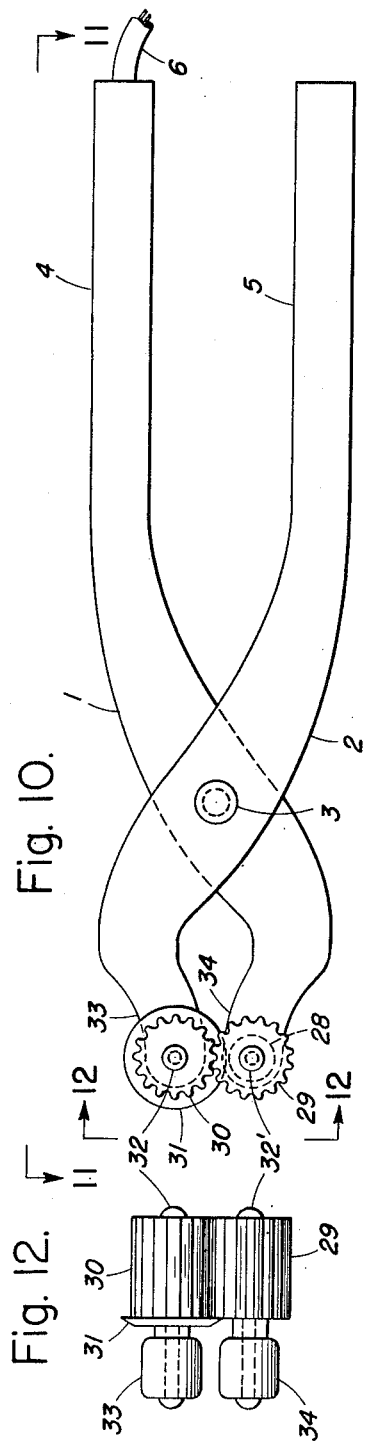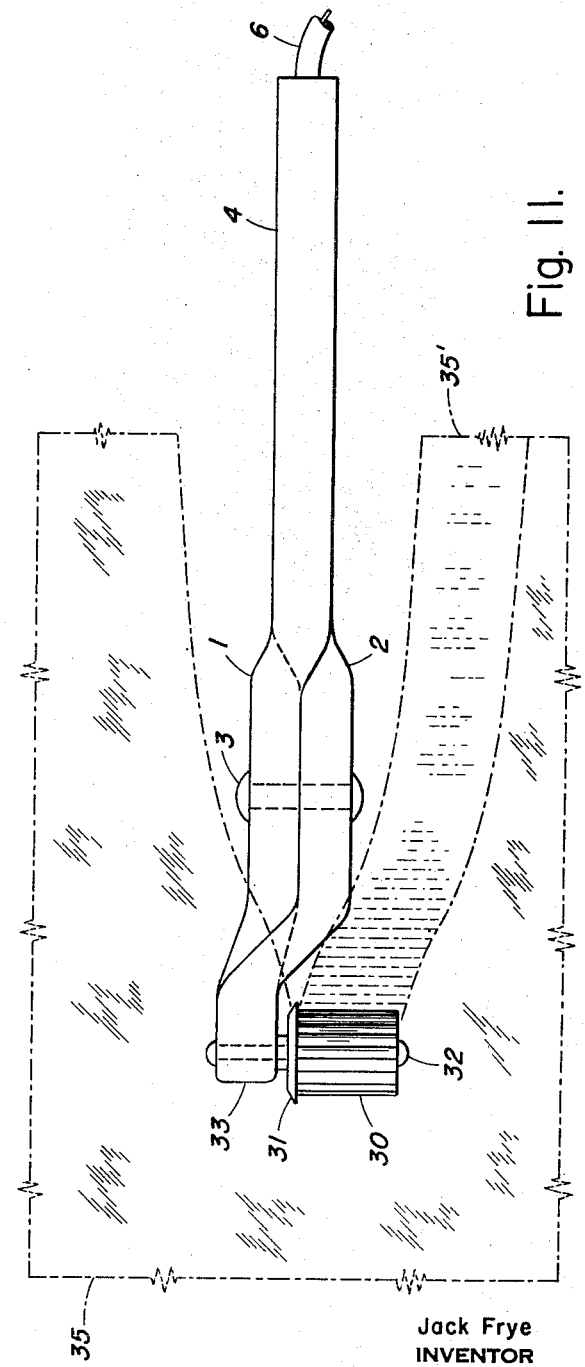
Jack Frye
INVENTOR

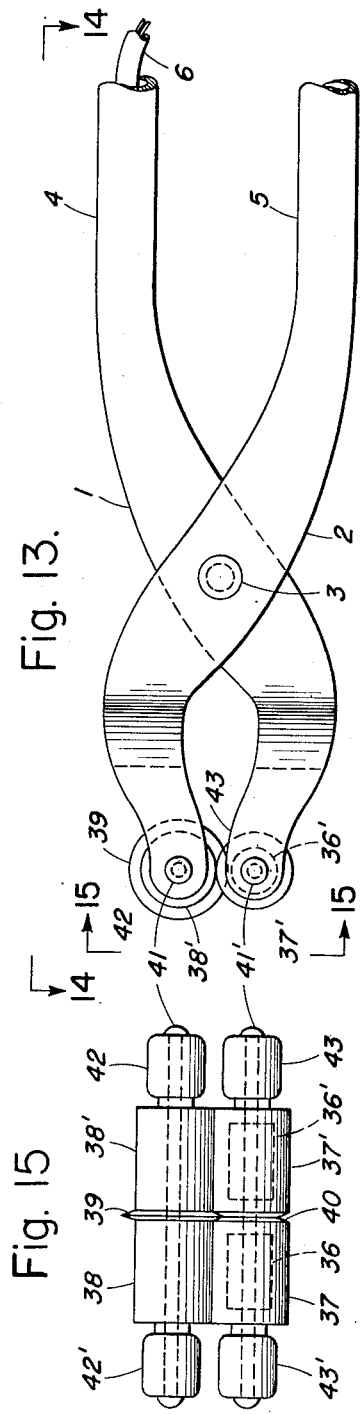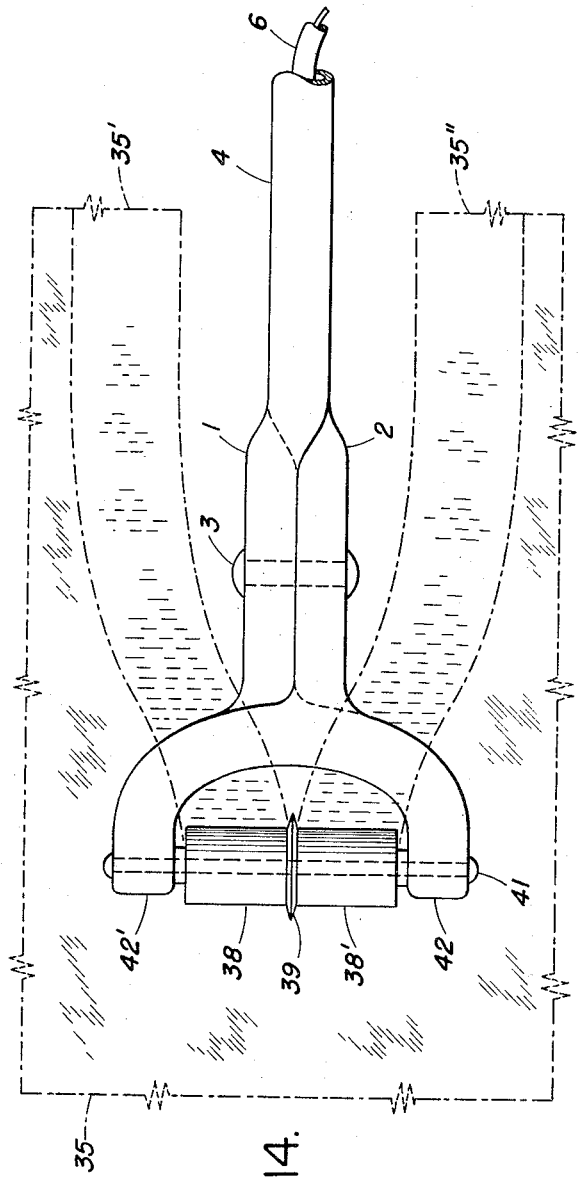

Aug. 14, 1956    J. FRYE    2,759,090
HEAT SEALING AND CUTTING DEVICE
Filed Oct. 20, 1952.    6 Sheets-Sheet 6
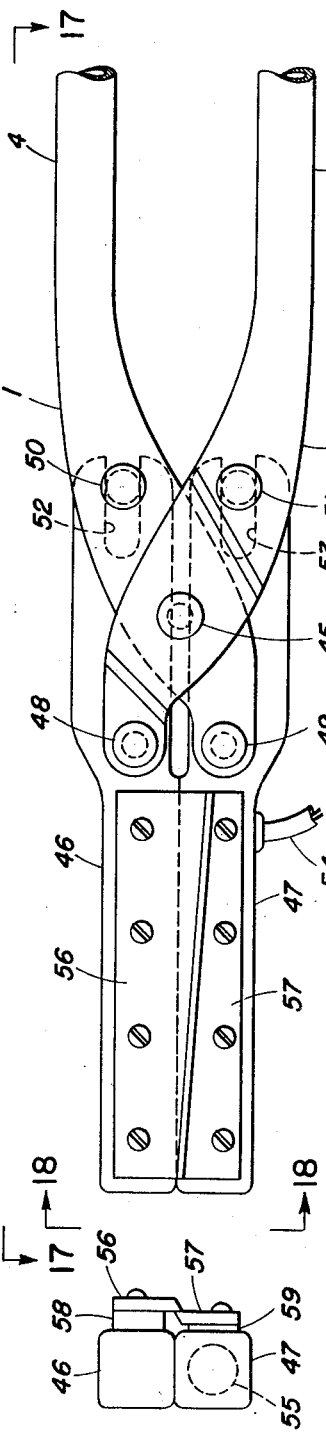
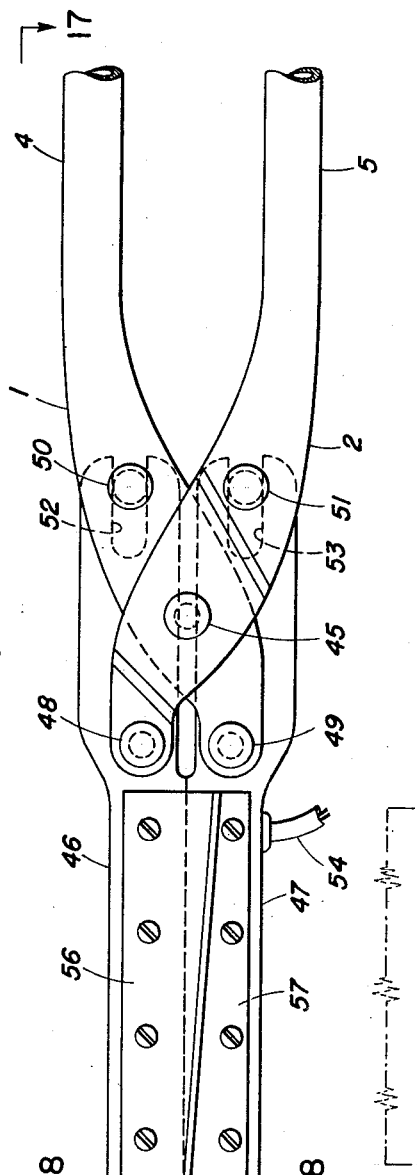
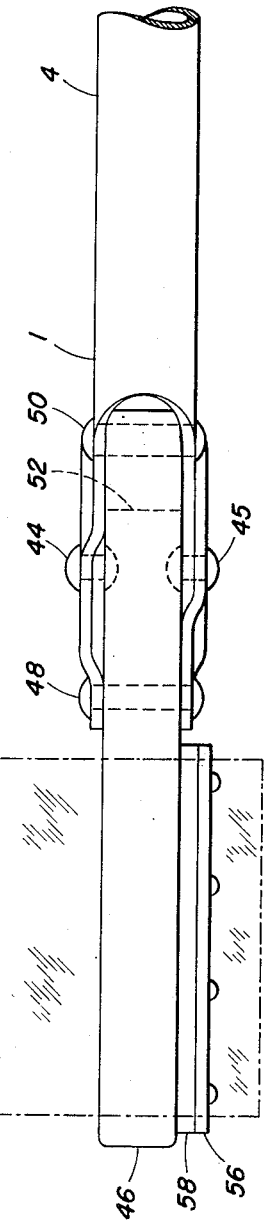
Jack Frye
INVENTOR
BY
Donald F. McCarthy
ATTORNEY

United States Patent Office 2,759,090
Patented Aug. 14, 1956

2,759,090

HEAT SEALING AND CUTTING DEVICE

Jack Frye, Crystal River, Fla.

Application October 20, 1952, Serial No. 315,704

1 Claim. (Cl. 219—21)

This invention relates to heat sealing and cutting devices, and more particularly to simple household or office tools for uniting two or more layers of sheet or similar material by fusion of a thermoplastic material and cutting the united layers through or adjacent the fused areas.

This application is a continuation-in-part of my copending application Serial No. 787,801 filed November 24, 1947, now U. S. Patent No. 2,615,113, entitled "Heat Sealing Tool." In that application there are disclosed various problems involved in uniting layers of material by means of fusion of a thermoplastic material. The invention in said copending application comprises the provision of a heat sealing tool of plier-like construction particularly adapted for household or office use, as more fully described and claimed therein.

In many instances in which layers of material are to be united by fusion of thermoplastic material, as for example by means of the devices disclosed and claimed in said copending application, it is highly desirable or necessary to trim or cut off surplus material or to divide the heat sealed area to provide two sealed edges. Other reasons why a cutting operation in conjunction with the heat sealing operation would be highly desirable will become evident from the description set forth hereinafter.

It is an object of the present invention to provide a combination sealing and cutting device for thermoplastic materials which is sufficiently simple, inexpensive and easy to operate to be marketable as a household utensil or office device with all the characteristics of simplicity, low price and small space consumption usually associated with articles of this kind.

It is a further object of the invention to provide a combination sealing and cutting device for plastic sheets and similar material which, in spite of its low cost and extreme simplicity of operation, is capable of making, trimming and/or dividing uniform and homogeneous seams of the airtight variety as well as of a more intermittent, tacking type, the device being particularly designed for such occasional uses as occur in the home as distinguished from industrial practice.

It is a still further object of the invention to provide a combination heat sealing and cutting device for thermoplastic material which is operable by a housewife or an unskilled operator without there being any danger of injury from either electrical or mechanical contact with energized or moving parts of the operating mechanism.

Other objects and advantages will appear from the following description and accompanying drawings, in which various embodiments of the instant invention are shown for illustrative purposes. In the drawings:

Figures 1, 2 and 3 are, respectively, side elevation view, plan view from the direction of arrows 2 in Figure 1, and end view from the direction of arrows 3 in Figure 1, of an embodiment of the invention in which the jaws of the plier-like device are provided with cooperating heat sealing surfaces and juxtaposed pinking shears.

Figures 4, 5 and 6 are, respectively, side elevation view, plan view from the direction of arrows 5 in Figure 4, and end view from the direction of arrows 6 in Figure 4, of an embodiment of the invention in which each jaw of the plier-like device is bifurcated and provided with cooperating corrugated heat sealing surfaces on each of the bifurcated portions and a cutting member between the bifurcated portions of one of said jaws.

Figures 7, 8 and 9 are, respectively, side elevation view, plan view from the direction of arrows 8 in Figure 7, and end view from the direction of arrows 9 in Figure 7 of an embodiment of the invention in which one of the jaws of the plier-like device is provided with a heat sealing member and a cutting member in retractable relationship.

Figures 10, 11 and 12 are, respectively, side elevation view, plan view from the direction of arrows 11 in Figure 10, and end view from the direction of arrows 12 in Figure 10 of an embodiment of the invention in which the jaws of the plier-like device are provided with cooperating heat sealing gear-like rollers and a cutting member on one of said rollers.

Figures 13, 14 and 15 are, respectively, side elevation view, plan view from the directoin of arrows 14 in Figure 13, and end view from the direction of arrows 15 in Figure 13, of an embodiment of the invention in which each jaw of the plier-like device is bifurcated and provided with cooperating heat sealing rollers on each of the bifurcated portions and a cutting member between the rollers on one of the jaws.

Figures 16, 17 and 18 are, respectively, side elevation view, plan view from the direction of arrows 17 in Figure 16, and end view from the direction of arrows 18 in Figure 16, of an embodiment of the invention in which the jaws of the plier-like device are mounted by means adapted to maintain a parallel relationship during the opening and closing movements of the device.

Referring now to the device shown in Figures 1, 2 and 3, it will be seen that it comprises arms 1 and 2 pivoted together by pivot pin 3. The handles 4 and 5, respectively, may be formed of insulating material or have insulation applied thereto. An electric cord 6 supplies electric energy to heating element 7 disposed in jaw 8 at the end of arm 2. If desired, the same electric cord could be branched adjacent the pivot pin 3 to supply electric energy to a heating element disposed in jaw 9, as illustrated in Figure 1 of the aforementioned copending application. In closed position as shown, the faces of jaw ends 8 and 9 cooperate to heat-seal layers of themoplastic material 12 placed therebetween by means of heat and pressure. Spring 4' is attached to handles 4 and 5 in such maner as to normally hold said jaw ends in open position. Jaw ends 8 and 9 are provided at one side with cooperating pinking shear members 10 and 11, so that as the jaw ends are closed upon the superposed layers of thermoplastic material 12 to be sealed, said material will be cut along a line adjacent and parallel to the heat-sealed strip. There is thus produced in one operation a neatly trimmed heat-sealed edge across the width of the sheet of superposed layers of thermoplastic material. It will, of course, be understood that ordinary straight-edge scissor-like shear members may be employed instead of the pinking scissor-like shear members illustrated, whereby a straight edge would be produced instead of the scalloped edge produced by the pinking shears.

In the device shown in Figures 4, 5 and 6, a cutting member 16 is disposed between bifurcated upper jaw ends 13 and 13' which latter cooperate, when in closed position, with bifurcated lower jaw ends 14 and 14' separated by spacer 17. The cooperating faces 18 of the jaw ends in this modification are crimped or corrugated. The lower jaw ends are provided with heating elements 15 and 15' energized by electric cord 6. In this modification it will be seen that closing the jaw ends of the plier-like device across the width of the sheet of thermoplastic material 12 will simultaneously cut across the width of the material and produce a crimped heat-sealed area along each cut edge. In this manner, a separate later heat sealing operation along the otherwise unsealed edge is thereby eliminated.

In the embodiments hereinabove described, the cutting members are rigidly attached to the heat sealing jaw ends whereby, as the device is closed upon the thermoplastic material, said material is cut immediately prior to being pressed or squeezed between the cooperating heat sealing surfaces. If the material is under tension, there is a possibility that during the instant after cutting and before being clamped, pressed or squeezed between the heat sealing surfaces, the material may become disengaged from the tool. The embodiment shown in Figures 7, 8 and 9 is designed to remove this possibility. In this embodiment a heating element 19 is shown in lower heat sealing jaw end 21. The upper cooperating heat sealing jaw end 20 is retractably mounted on cutting member 22 by means of guide pins 23 and 23' moving in slots 24 and 24' in said cutting member 22. Heat sealing member 20 is spring biased and held in compression against lower heat sealing member 21 by means of leaf spring 25 rigidly mounted on cutting member 22 by means of bolts or screws 26. The ends of the leaf spring rest in compression on the upper surface of the heat sealing member 20. It will thus be seen that as the device is closed across the width of the sheet 12 of thermoplastic material, heat sealing members 20 and 21 cooperate to clamp and heat-seal said material before cutting member 22 descends to cut the material adjacent the heat sealed area. Stops 27 prevent the device being closed further than necessary, whereby undue compression would be placed on sealing member 20 by leaf spring 25. The closed positions of the cutting member 22 and leaf spring 25 are indicated by reference characters 22' and 25', respectively.

In the embodiment shown in Figures 10, 11 and 12, the heat sealing members are in the form of cooperating rollers 29 and 30 mounted on the lower and upper jaw ends, respectively 34 and 33, by means of pins 32' and 32. Heating element 28 is disposed in lower roller 29. A cutting wheel 31 is provided of larger diameter and in axially displaced relationship to upper roller 30 so as to cooperate with lower roller 29 to cut the thermoplastic material along the edge of the heat sealed area as the device is moved across the width of the sheet 35 of superposed layers of thermoplastic material. The heat sealing rollers 29 and 30 are shown as having cooperating corrugated, gear-like surfaces, which surfaces assist in providing rotating force to the heat sealing rollers and cutting wheel 31 as the device is moved across the width of the sheet 35 of superposed layers of thermoplastic material, whereby to produce in one operation a heat-sealed and trimmed edge 35'. A further advantage of the use of corrugated heat sealing surfaces is that the heat sealed area thereby produced is physically stronger and better bonded or fused due to the increased area of fusion between the layers.

In the embodiment shown in Figures 13, 14 and 15, heat sealing rollers 37 and 37' are mounted on bifurcated lower jaw ends 43' and 43 by means of pin 41. Cooperating heat sealing rollers 38 and 38' are mounted on jaw ends 42' and 42 by means of pin 41. Heat sealing elements 36 and 36' are disposed in lower rollers 37 and 37'. A cutting wheel 39 is mounted on pin 41 between upper heat sealing rollers 38 and 38' and cooperates with slot 40 between lower heat sealing rollers 37 and 37' whereby two heat sealed and trimmed edges 35' and 35" are simultaneously produced as the device is closed upon and moved across the width of the sheet 35 of thermoplastic material.

In the devices described hereinabove, particularly in Figures 1 through 9, the jaw ends do not move in parallel position whereby when fully opened, the sealing surfaces closest to the pivot pin 3 are fairly close together. It may thus be somewhat difficult to insert the sheet of thermoplastic material between the heat sealing surfaces without accidentally prematurely contacting one of said surfaces and thus damaging the material. The modification shown in Figures 16, 17 and 18 is designed to substantially eliminate this possibility by providing a leverage system which will permit the heat sealing surfaces to move together and apart in parallel relationship. In this embodiment the arms 1 and 2 are forked at their forward portions and these portions are closed and pivoted together by means of separate pivot pins 44 and 45 at opposite sides of the tool. In other words, the side portion or tine of one fork is pivoted to the adjacent side portion or tine of the other arm by a separate pivot at one side of the tool and the same arrangement is adopted at the opposite side. Heat sealing jaw ends 47 and 46 are, respectively, connected to arms 1 and 2. Said jaw ends are mounted for parallel movement in the well-known way by means of pivot pins 49 and 48 at the forward extremities of arms 1 and 2 and guide pins 50 and 51 carried by arms 1 and 2 moving in engaging slots 52 and 53 at the rear ends of heat sealing jaws 46 and 47. This system of leverage for providing jaw ends with parallel motion is old and well-known. As shown, the electric cord 54 provides electric energy to heating element 55 in lower heat sealing jaw end 47. The heat sealing jaw ends are provided at one side with cooperating shearing members 56 and 57 heat insulated from their respective heat sealing members 46 and 47 by means of insulators 58 and 59.

In the drawings and in the above description the type of heating element has not been described or illustrated since this would be a matter of choice, depending on various considerations such as the economics involved, the type of material to be sealed, the frequency of use expected (light or heavy duty), the particular embodiment selected, and the like. Usually resistance heating elements would be employed as these are the simplest and cheapest forms for household use. If desired the principle of dielectric heating may be made use of to heat and fuse the thermoplastic material. The use of the latter principle, of course, is well-known and requires the provision of electric energy from a high frequency oscillator, in addition to proper heating elements and the like. Dielectric heating is highly desirable in some instances because its use would heat and fuse the thermoplastic material without heating and thereby affecting the alignment, temper, etc. of the jaw ends and cutting members.

It will, of course, be obvious that the various features disclosed in any one embodiment illustrated in the drawings may be made use of where possible and desirable in any of the other embodiments. For example, any of the embodiments may be equipped with cooperating heat sealing means to impart a series of longitudinal or lateral corrugations or crimps, or a smooth surface, continuously or intermittently to the sealed areas. Heating elements may be provided in any number of the heat-sealing members of the various embodiments of this invention. Similarly, any of the embodiments of this invention may be provided with stationary or movable cutting members adapted to provide a straight or scalloped edge to the heat sealed area. The cutting principle may be based on the use of shearing forces, compression forces or the like. The retractable mounting illustrated in Figures 7, 8 and 9, the spring 4' or equivalent means for normally holding apart the heat-sealing surfaces as illustrated in Figures 1, 2 and 3, and the principle of parallel moving heat-sealing surfaces obtainable for example by means of the leverage system illustrated in Figures 16, 17 and 18, may be readily adapted for use in any of the other embodiments of this invention. It should be obvious that adequate insulation of appropriate type and appropriately located may be provided to confine the electrical and heat energy employed in the use of the tool of this invention to the desired areas without departing from or altering the essence of the invention. If desired, any of the embodiments of this invention may be provided with protective shields for the heat sealing and cutting members to prevent damage or injury by accidental contact therewith. Various auxiliary devices such as thermostatic controls to regulate the heating elements may be used in any of the embodiments of this invention.

Various modifications and variations of this invention will be obvious to a person skilled in the art and such variations and modifications are to be regarded as within the purview of this application and the spirit and scope of the appended claim.

I claim:

A portable heat sealing and cutting tool of plier-like construction comprising: a pair of crossed pivoted arms forming handles at one end and provided with jaws pivoted on the other end of said arms for substantially parallel movement into and out of closing relationship, said jaws having laterally extending heat sealing surfaces adapted to contact each other in substantial parallelism when closed and having cooperating cutting parts; and an electrical heating element in at least one of said jaws adapted to supply heat to material held between said heat sealing surfaces; said cutting parts comprising scissor-like shearing edges rigidly mounted lengthwise of said jaws adjacent said heat sealing surfaces, the longitudinal cutting edges of said cutting surfaces being at an angle to the heat sealing surfaces.

References Cited in the file of this patent

UNITED STATES PATENTS

| | | |
|---|---|---|
| 1,083,386 | Chapman | Jan. 6, 1914 |
| 2,232,640 | Schwartzman | Feb. 18, 1941 |
| 2,441,817 | Huff | May 18, 1948 |
| 2,443,749 | Stunkel | June 22, 1948 |
| 2,476,325 | Rowe | July 19, 1949 |
| 2,551,811 | Mueller | May 8, 1951 |
| 2,615,113 | Frye | Oct. 21, 1952 |
| 2,641,304 | Biddinger et al. | June 9, 1953 |